UNITED STATES PATENT OFFICE.

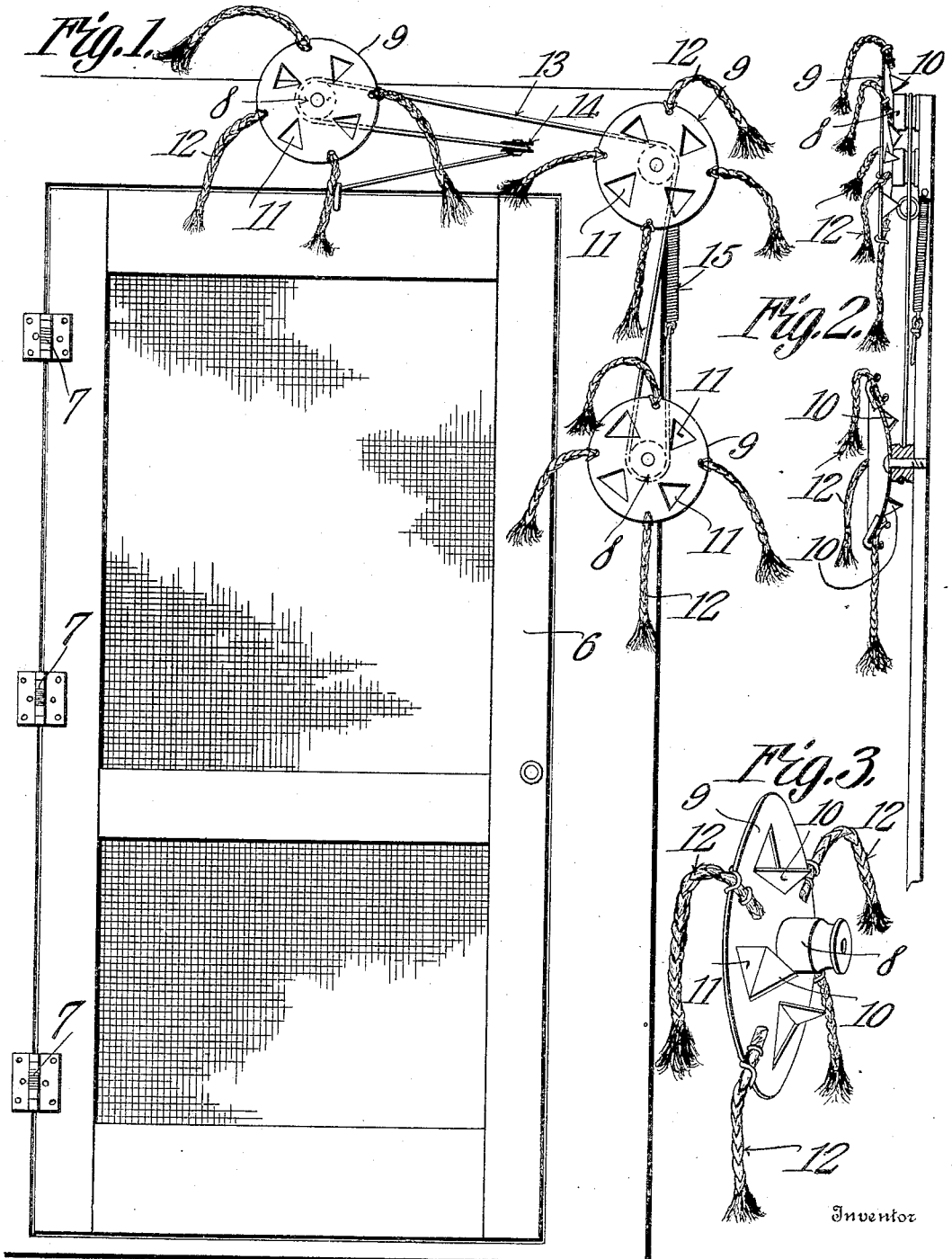

JUDSON N. HATCHER, OF JASPER, MISSOURI.

FAN ATTACHMENT FOR DOORS.

941,921.  Specification of Letters Patent.  Patented Nov. 30, 1909.

Application filed June 1, 1909. Serial No. 499,332.

*To all whom it may concern:*

Be it known that I, JUDSON N. HATCHER, a citizen of the United States, residing at Jasper, in the county of Barton and State of Missouri, have invented a new and useful Fan Attachment for Doors, of which the following is a specification.

It is the object of the present invention to provide an attachment for screen doors designed for the purpose of driving flies and other insects away from the vicinity of the door when the same is being opened and closed.

It is a further object of the invention to provide a means for this purpose which will not be annoying to a person passing through the doorway when the door is opened or closed and which will yet act very effectually to drive away the insects in the vicinity of the door.

The invention, broadly speaking, resides in certain rotatable disks arranged about the edge of the door, preferably upon the door frame, and having stamped therefrom fan blades and attached thereto streamers which, when the disks are rotated by the opening and closing of the door, are rapidly swished through the air for the purpose stated, the fan blades also serving to create a draft, or in other words to disturb the air current for the purpose of driving away the insects.

In the accompanying drawings, Figure 1 is a view in front elevation of a door and its frame showing the invention arranged thereon, Fig. 2 is an edge view of the door and frame showing the invention also in edge view. Fig. 3 is a detail perspective view of one of the rotatable disks.

In the drawings, the door frame is indicated by the numeral 5 and the door is indicated by the numeral 6, the door being preferably mounted in the frame by spring hinges 7 which have a normal tendency to hold the door closed and which will automatically act to close the door when opened and then released.

In carrying out the invention, a plurality of air disturbing members are rotatably arranged about the edge of the door as heretofore stated and each of these members embodies a rotatable pulley 8 which is journaled upon the door frame, and a disk 9 which is concavo-convex in form and has its convex face presented toward the door frame and its concave face away from the said frame. Each of the disks 9 is formed with angularly directed slits and the material between these slits is struck up to form fan blades which project inwardly from the convex face of the disk and are substantially triangular in form although it will be readily understood that they may have any other desired outline if so desired. It will be understood of course that the pulleys are located concentrically with respect to the respective disks and that the disks, when rotating, will disturb the air in their vicinity owing to the fan blades which are formed thereon, these blades being indicated by the numeral 10. It will further be understood that inasmuch as the fan blades 10 project from the convex faces of the disks, they will have better effect in serving to disturb the air than would be the case should they project from a plane face or a concave face. Furthermore, inasmuch as the fan blades project toward the door frame, they will not be liable to come in contact with the clothes of a person entering the doorway. Also it will be apparent that by forming the blades by stamping from the disks, air will be forced by the blades through the openings 11 which result from the striking up of the blades.

Secured in any suitable manner at their inner ends to the disks at the edge thereof are streamers 12 which may be of cord, rope, or any other suitable material which is sufficiently flexible for the purpose and are shown, in the present instance, as in the form of cords having frayed ends.

In order that the pulley carrying the air agitating disks may be rotated upon opening and closing of the door 6, there is provided a cable 13 and this cable is connected at one end to a door 6 and is passed about one of the pulleys 8, there being three such pulleys shown in the present instance, after having been passed around the idle pulley 14 mounted upon the door frame. The cable 13 is then passed about a second one of the pulleys 8 and then about a third one and is connected at its other end to one end of a spring 15 which spring is connected to the door frame 5. Upon swinging the door to open position, a pull will be exerted upon the cable against the tension of the spring 15 causing the rotation of the several pulleys 8. As soon as the door is released, not only will the spring hinges 7 swing it into closed position but the spring 15 will exert a pull upon the cable 13 which pull will result in the pulleys 8 being rotated in an opposite direction. It will be observed furthermore, that the spring 15 serves to hold the cable taut at all times whereby rotation of the pulleys 8 is positively assured.

What is claimed is:—

1. The combination with a door and its frame, of rotatable disks arranged about the edge of the door, connection between the door and the frame to rotate said disks upon opening or closing of the door, and streamers carried by the disks.

2. The combination with a door and its frame, of rotatable disks arranged about the edge of the door, connection between the door and the frame to rotate said disks upon opening or closing of the door, and streamers carried by the disks and having frayed ends.

3. The combination with a door and its frame, of rotatable fan disks arranged about the edge of the door, connection between the door and the frame to rotate said disks upon opening or closing of the door, and streamers carried by the disks.

4. The combination with a door and its frame, of rotatable disks arranged about the edge of the door, each of said disks having stamped therefrom a fan blade, connections between the door and the frame to rotate said disks upon opening or closing of the door, and streamers carried by the disks.

5. The combination with a door and its frame, of rotatable concavo-convex disks arranged about the edge of the door, and having fan blades struck up therefrom and projecting from the convex face thereof, connection between the door and the frame to rotate said disks upon opening or closing of the door, and streamers carried by the disks.

6. The combination with a door and its frame, of rotatable disks arranged about the edge of the door, connection between the door and the frame to rotate said disks upon opening or closing of the door, and flexible streamers connected at their inner ends to the disks at the edge thereof.

In testimony that I claim the foregoing as my own, I have hereto affixed my signature in the presence of two witnesses.

JUDSON N. HATCHER.

Witnesses:
  JOHN W. SPAID,
  R. R. LANICK.